(12) United States Patent
Nitschke et al.

(10) Patent No.: US 10,011,514 B2
(45) Date of Patent: Jul. 3, 2018

(54) APPARATUS FOR POSITIONING GLASS SHEETS FOR FORMING

(71) Applicant: GLASSTECH, INC., Perrysburg, OH (US)

(72) Inventors: David B. Nitschke, Perrysburg, OH (US); Dean M. Nitschke, Maumee, OH (US); Daniel P. Lechner, Rossford, OH (US)

(73) Assignee: GLASSTECH, INC., Perrysburg, OH (US)

( * ) Notice: Subject to any disclaimer, the term of this patent is extended or adjusted under 35 U.S.C. 154(b) by 0 days.

(21) Appl. No.: 14/489,882

(22) Filed: Sep. 18, 2014

(65) Prior Publication Data

US 2015/0000346 A1 Jan. 1, 2015

Related U.S. Application Data

(62) Division of application No. 13/274,827, filed on Oct. 17, 2011, now Pat. No. 8,881,551.

(51) Int. Cl.
*C03B 11/16* (2006.01)
*C03B 23/03* (2006.01)

(52) U.S. Cl.
CPC .......... *C03B 23/03* (2013.01); *C03B 2225/02* (2013.01)

(58) Field of Classification Search
CPC . C03B 35/163; C03B 35/164; C03B 2225/00; C03B 2225/02; C03B 23/03
See application file for complete search history.

(56) References Cited

U.S. PATENT DOCUMENTS

| 4,666,493 | A | * | 5/1987 | Frank ...................... C03B 23/03 294/65 |
| 4,895,244 | A | | 1/1990 | Flaugher et al. |
| 4,985,059 | A | * | 1/1991 | Letemps ............. C03B 23/0254 198/394 |
| 5,066,321 | A | * | 11/1991 | Kramer ............... C03B 23/0302 294/64.3 |
| 5,090,989 | A | * | 2/1992 | Adoline ................ C03B 23/023 65/107 |
| 5,092,366 | A | | 3/1992 | Sakamoto |

(Continued)

FOREIGN PATENT DOCUMENTS

CN 1384074 A 12/2002
WO 2006/022309 A2 3/2006

OTHER PUBLICATIONS

Extended European Search Report dated Jul. 15, 2015, Application No. 12841047.9-1355 / 2768780, Applicant Glasstech, Inc., 9 Pages.

(Continued)

*Primary Examiner* — Michael J Felton
*Assistant Examiner* — Yana B Krinker
(74) *Attorney, Agent, or Firm* — Brooks Kushman P.C.

(57) ABSTRACT

Apparatus (54) for positioning performed glass sheets for further forming includes positioners (55) that are moved slower than the speed of glass sheet conveyance to provide rotational adjustment of a glass sheet into alignment above a forming mold (52) under the operation of a controller (78). The forming mold (52) is moved upwardly for the forming in a pressing manner against a downwardly facing upper mold (58).

7 Claims, 6 Drawing Sheets

(56) References Cited

U.S. PATENT DOCUMENTS

| | | | |
|---|---|---|---|
| 5,096,478 A * | 3/1992 | Kramer | C03B 35/24 |
| | | | 65/25.3 |
| 5,902,366 A * | 5/1999 | Schnabel, Jr. | C03B 23/03 |
| | | | 65/106 |
| 6,543,255 B2 | 4/2003 | Bennett et al. | |
| 6,918,268 B2 | 7/2005 | Fukai et al. | |
| 8,881,551 B2 | 11/2014 | Nitschke et al. | |
| 2002/0166344 A1 * | 11/2002 | Fukai | B65G 49/064 |
| | | | 65/254 |
| 2002/0189290 A1 * | 12/2002 | Bennett | C03B 23/0254 |
| | | | 65/104 |
| 2003/0182969 A1 * | 10/2003 | Dunifon | C03B 23/03 |
| | | | 65/323 |
| 2008/0245107 A1 * | 10/2008 | Bennett | C03B 23/03 |
| | | | 65/29.14 |
| 2011/0247367 A1 | 10/2011 | Nitschke et al. | |

OTHER PUBLICATIONS

Chinese Second Office Action dated Jul. 15, 2016, Application No. 201280059620.1, Applicant Glasstech, Inc., 3 Pages.
Russian Office Action dated Aug. 3, 2016, Application No. 2014116880/03(026610), Applicant Glasstech, Inc., 6 Pages.
Chinese Office Action dated Dec. 14, 2015, Application No. 201280059620.1, 9 Pages.
Mexican First Office Action No. 24433, Application No. MA/a/2014/004661, Applicant Glasstech, Inc., 4 Pages.
Mexican 1st Substantive Office Action No. 8532, Application No. MX/a/2017/012355, Applicant Glasstech, Inc., 3 Pages.
PCT International Search Report and Written Opinion dated Jan. 4, 2013, Application No. PCT/US12/58844, Applicant Glasstech, Inc.—10 Pages.

* cited by examiner

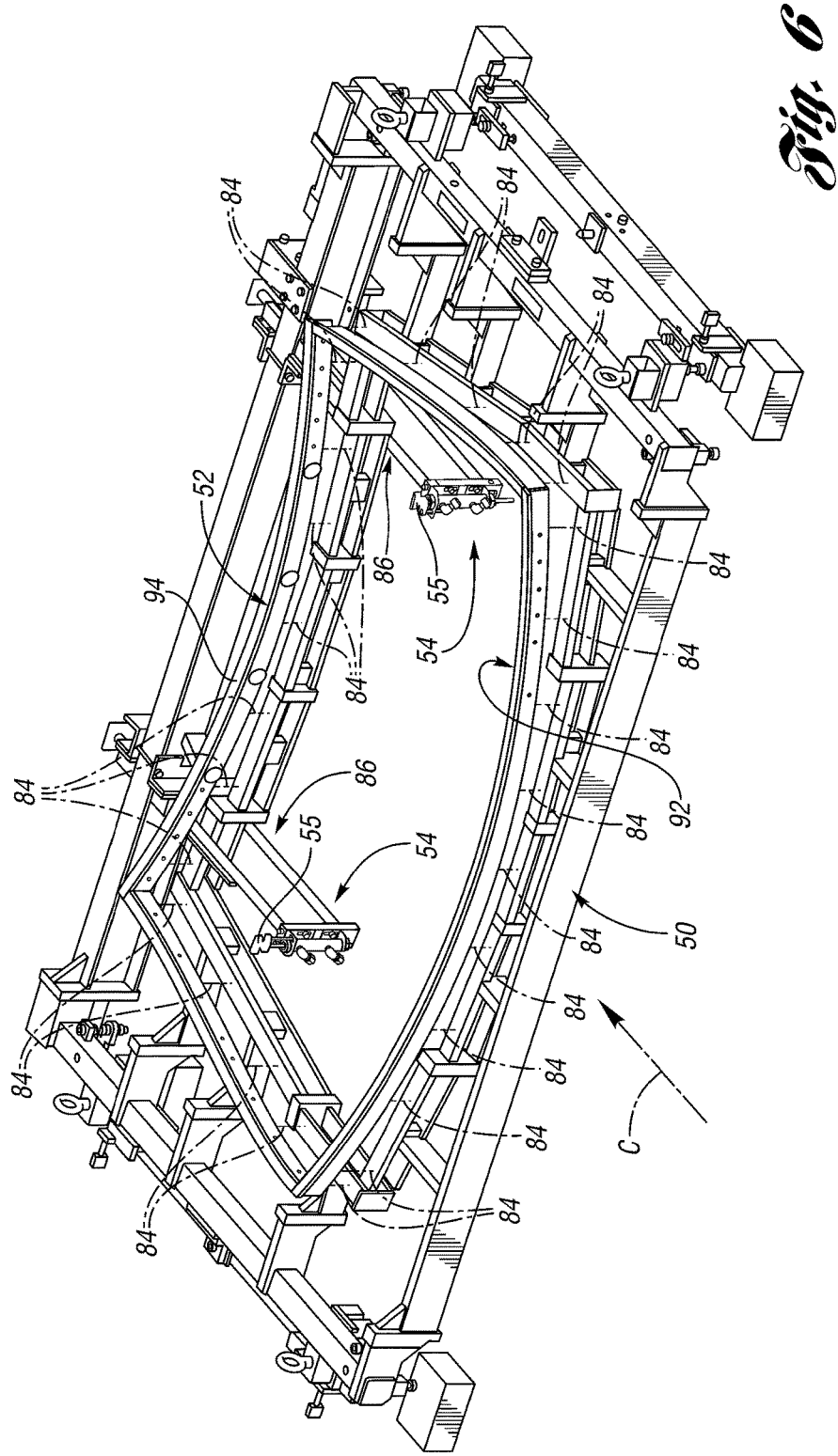

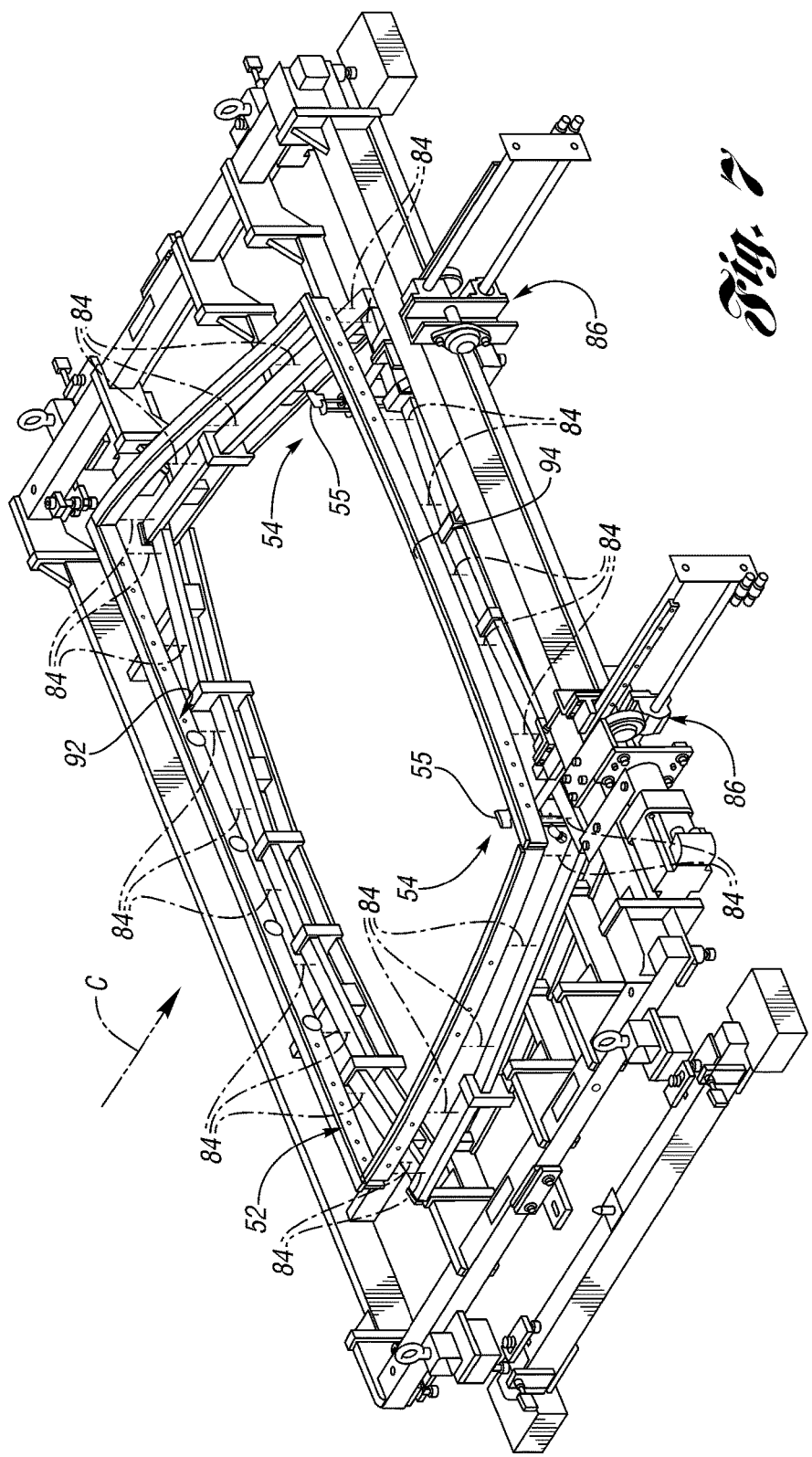

APPARATUS FOR POSITIONING GLASS SHEETS FOR FORMING

CROSS-REFERENCE TO RELATED APPLICATIONS

This application is a divisional of U.S. application Ser. No. 13/274,827 filed on Oct. 17, 2011 by David B. Nitschke, Dean M. Nitschke and Daniel P. Lechner under the title METHOD AND APPARATUS FOR POSITIONING GLASS SHEETS FOR FORMING, the entire disclosure of which is hereby incorporated by reference.

TECHNICAL FIELD

This invention relates to an apparatus for positioning glass sheets for forming and for forming of glass sheets after the positioning.

BACKGROUND

Glass sheets after heating have previously been formed by conveyance on a lower roll bed to above a forming mold that is moved upwardly to provide the forming, see U.S. Pat. No. 6,543,255. The roll bed can include wheels or, as disclosed in U.S. Patent Application Publication No. US2011/0247367 entitled PRESS BENDING STATION AND METHOD FOR BENDING HEATED GLASS SHEETS by Dean M. Nitschke et al., can include elongated rollers or wheels and elongated rollers that are selectively attachable and detachable for rotational driving and positioning to provide the required shape for the mold to move vertically from below to above the conveyor for lifting of the heated glass sheet for the forming. The above referenced patent and application are hereby incorporated by reference.

SUMMARY

An object of the present invention is to provide improved apparatus for positioning a heated glass sheet for forming.

In carrying out the immediately preceding object, the apparatus for positioning a heated glass sheet for forming includes a roll conveyor for conveying a heated glass sheet horizontally at a conveyor speed in a path along a direction of conveyance outwardly from a heating furnace and away from the furnace, and includes a conveyor drive that drives the roll conveyor. The apparatus has an upwardly facing forming mold with an upwardly concave curved shape and an open center and, the apparatus also has a pair of positioners located within the open center of the forming mold adjacent its downstream portion and spaced laterally along the direction of conveyance in the path of the conveyed glass sheet for movement between upstream and downstream positions as the glass sheet is moved above the forming mold, and the apparatus also has supports for the positioners for movement vertically between an upper position to contact the glass sheet and a lower position that allows the glass sheet to move over the positioners. A positioner drive of the apparatus moves the pair of positioners along the direction of conveyance. A controller of the apparatus is configured to operate the conveyor drive and the positioner drive so: (a) the pair of positioners are initially moved while in the upper position along the direction of conveyance at a slower speed than the conveyor speed such that the conveyed glass sheet contacts the positioners to provide rotational adjustment of the glass sheet; and (b) the controller subsequently moves the positioners faster than the conveyor speed and the conveyed glass sheet so the positioners move out of contact with the glass sheet and then downwardly to the lower position in preparation for the glass sheet moving over the positioners and into vertical alignment with the forming mold.

The controller disclosed is configured to operate the conveyor drive and the positioner drive so the speed of the conveyor and the speed of the positioners are decelerated at the same rate as each other prior to the positioners moving faster than the conveyor speed. More specifically, the controller disclosed operates the conveyor drive and the positioner drive so, after the deceleration of the conveyor and the positioners at the same rate as each other and before the positioners begin moving faster than the speed of the conveyor, the speed of the conveyor continues to decelerate and speed of the positioners accelerates until the speed of the conveyor and the speed of the positioners are the same as each other whereupon the positioners move out of contact with the glass sheet as the speed of the conveyor continues to decelerate and the speed of positioners continues to accelerate but at a greater rate. Also, the positioners move out of contact with the glass sheet at a location upstream a predetermined distance along the direction of conveyance from the location at which the glass sheet moves into vertical alignment with the forming mold.

The disclosed forming mold has an open center and a peripheral shape that corresponds to the periphery of the glass sheet, the forming mold has a downstream portion, the pair of positioners are mounted within the open center of the forming mold adjacent its downstream portion, and a mold actuator moves the forming mold upwardly to lift the moving glass sheet from the conveyor for forming. The disclosed apparatus also includes an upper mold that cooperates with the forming mold to press form the glass sheet.

The roll conveyor including rolls that provide an upwardly concave conveying shape for conveying a heated glass sheet that is previously formed.

BRIEF DESCRIPTION OF THE DRAWINGS

FIG. 6 is a perspective view of a forming mold of the apparatus viewed from a lateral upstream direction and showing positioners in preparation for a positioning operation of a conveyed glass sheet.

FIG. 7 is another view of the forming mold taken from a lateral downstream position and showing the positioners after movement along the direction of conveyance to provide positioning of a conveyed glass sheet into vertical alignment with the mold.

DETAILED DESCRIPTION OF THE PREFERRED EMBODIMENTS

Figure 1:
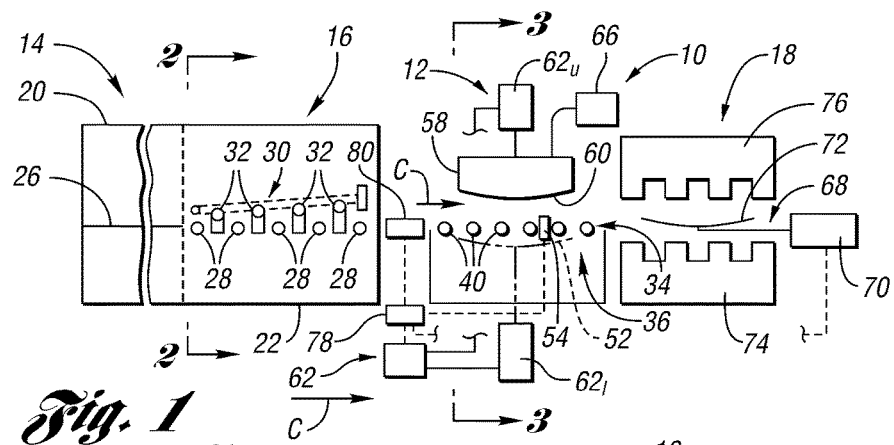
FIG. 1 is a schematic side elevation view of a glass sheet press forming system that includes positioning apparatus for positioning a heated glass sheet on a forming mold to provide positioning and forming according to the present invention.

With reference to FIG. 1 of the drawings, a system for forming glass sheets is generally indicated by 10 and includes a forming station 12 and a furnace 14 having a roll forming station 16 just upstream along a direction of conveyance C from the press bending station 12. Downstream from the press forming station 12 along the direction of conveyance C, the system 10 is illustrated as including a final processing station 18 at which the formed glass sheet can be slowly cooled for annealing or more rapidly cooled by quenching to provide heat strengthening or tempering.

As illustrated by continuing reference to FIG. 1, the furnace 14 has entry and exit ends 20 and 22 and includes a heating chamber 24 (FIG. 2) having a conveyor 26 for conveying glass sheets along the direction of conveyance through the furnace from the entry end to the exit end for heating. The conveyor 26 on which the glass sheets are heated can be either a conventional gas hearth or a roll conveyor on which the glass sheets are conveyed during heating from ambient temperature to a sufficiently high temperature to permit form forming, which is also referred to as bending in the glass sheet industry.

Figure 2:
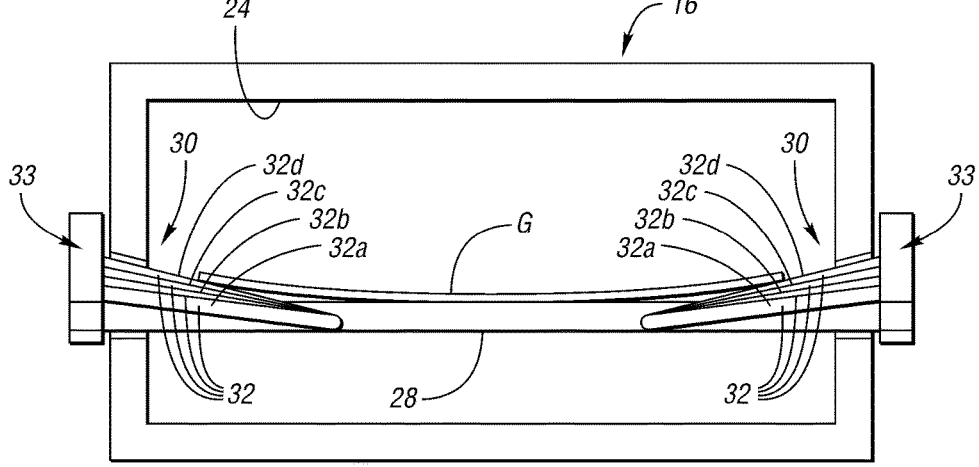
FIG. 2 is a schematic cross sectional view through the system taken along the direction of line 2-2 in FIG. 1 at an exit end of a furnace of the system and illustrates horizontal and inclined rolls on which heated glass sheets are conveyed for initial roll forming prior to exiting the furnace in preparation for press forming.

The furnace exit end 22 includes the roll forming station 16 which is illustrated in FIG. 2 as having horizontally extending conveyor rolls 28 that are rotatively driven and spaced horizontally within the heating chamber along the direction of conveyance extending laterally with respect thereto to support and convey the heated glass sheets. The roll forming station 16 also includes a pair of sets 30 of bending rolls 32, with the bending roll sets 30 spaced laterally with respect to each other within the heating chamber 24 along the direction of conveyance. Each set of bending rolls 30 is supported and rotatively driven by a drive mechanism 33 with the bending rolls at progressively increasing inclinations along the direction of conveyance as illustrated by reference numerals $32_a$, $32_b$, $32_c$ and $32_d$ in FIG. 2. The conveyance of each heated glass sheet G along the direction of conveyance in cooperation with the bending rolls 32 provides initial forming of the glass sheet G along a direction transverse to the direction of conveyance as illustrated in FIG. 2. This forming provides the formed shape of the glass sheet with straight line elements that may be parallel to each other in a cylindrical shape or angled with respect to each other in a conical shape. As each location of the glass sheet along the direction of conveyance is bent from its flat shape, this bending also further bends the preceding location such that the net effect is a slightly conical shape.

Figure 3:
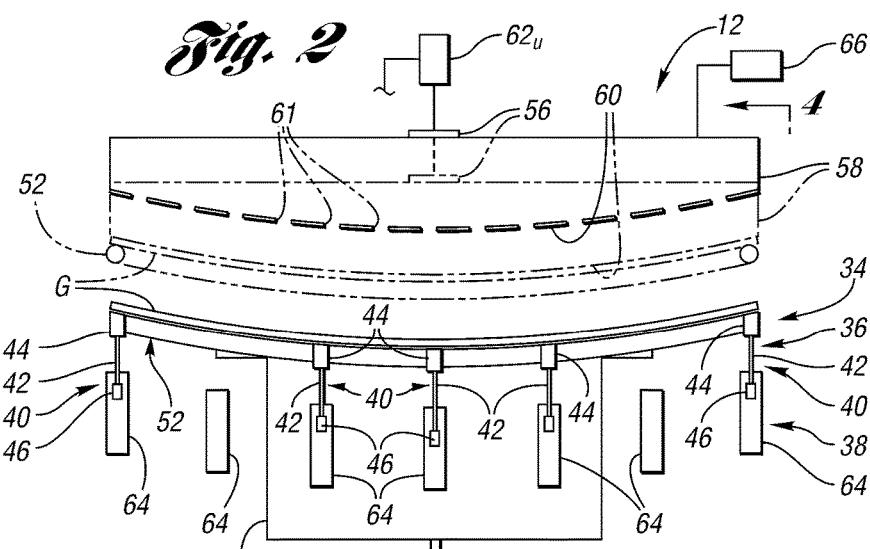
FIG. 3 is a schematic cross sectional view taken through the system along line 3-3 in FIG. 1 at its press or forming station to illustrate the construction of a lower forming mold provided by a ring and also illustrating the construction of an upper press mold, which molds are movable between the solid and phantom line indicated positions to press bend the initially roll formed glass sheet.

With combined reference to FIGS. 1 and 3, the press forming station 12 as previously mentioned is located externally of the furnace 14 downstream from its exit end 22 to receive the initially formed glass sheets from the roll forming station 16. More specifically, the press forming station 12 includes a conveyor having a lower wheel or roll bed 34 of the conveyor for receiving an initially formed glass sheet to be further press formed by press forming apparatus collectively indicated by 36. The lower wheel bed 34 includes a lower base structure 38 and a plurality of conveyor wheel assemblies 40. Each wheel assembly 40 as is hereinafter more fully described includes a housing 42 having an upper end including a wheel 44 and having a lower end including a detachable connection 46 for detachably connecting the wheel assembly to the base structure 38. A drive mechanism provides rotational driving of the wheel 44 of each wheel assembly 40 upon connection thereof to the lower base structure 38. For a more detailed description of the conveyor and the drive mechanism, refer to U.S. Pat. No. 6,543,255 which has previously been incorporated by reference. Also, it should be noted that the conveyor instead of having only wheel conveyor assemblies can also have elongated roller conveyor assemblies both horizontal and inclined as disclosed by U.S. patent application Ser. No. 12/756,521 filed on Apr. 8, 2010 by Nitschke et al. under the title Press Bending Station And Method For Bending Heated Glass Sheets, the entire disclosure of which has herein been incorporated by reference.

As illustrated in FIG. 3, a lower press ring support 50 of the press forming apparatus 36 supports a lower forming mold or press ring 52 that has an upwardly concave shape and is received within the wheel bed 34 below the wheels 44 of the wheel conveyor assemblies 40 in a ring shape thereof where no wheel assemblies are located. The construction of the lower press ring is hereinafter more fully described. Positioning apparatus 54 of the system includes positioners 55 (FIGS. 6-10) that rotate a conveyed glass sheet G to provide alignment with the forming mold 52 for forming.

As also illustrated in FIG. 3, an upper mount 56 of the press station 12 supports an upper press mold 58 of the press forming apparatus 36. This upper press mold 58 has a downwardly facing convex forming face 60 complementary to the upwardly concave shape of the lower press ring 52.

A mold actuator collectively indicated by 62 in FIG. 3 provides relative vertical movement between the lower press ring 52 and the wheel bed 34 and between the lower press ring and the upper press mold 58 to move the heated glass sheet above the wheel bed and ultimately into pressing engagement between the lower press ring and the upper press mold 58 to press form the glass sheet as is hereinafter more fully described. As disclosed, the actuator not only moves the lower press ring 52 upwardly but also moves the upper press mold 58 downwardly for cooperating with the lower press ring to press form the glass sheet. The actuator 62 includes a lower mold actuator $62_l$, and an upper mold actuator $62_u$, that respectively move the lower forming mold 52 and the upper mold 58 upwardly and downwardly. However, it should be appreciated that it is possible to only move the lower forming mold 52 upwardly and downwardly without any movement of the upper mold.

The press forming station 12 as illustrated by FIG. 3 and described above has the wheel bed 34 provided with an upwardly curved shape in a direction transverse to the direction of conveyance C along which the wheel bed receives the heated glass sheet corresponding to the initially formed shape provided by the roll forming station 16 illustrated in FIGS. 1 and 2. More specifically, the lower base structure 38 of the wheel bed 34 includes a plurality of rails 64 that extend along the direction of conveyance and have different elevations at which they support the wheel assemblies 40. This rail height positioning is provided by unshown adjusters to provide the curved shape of the wheel bed along a direction transverse to the direction of conveyance.

As also shown in FIG. 3, the upper press mold 58 has its forming face 60 provided with an array of holes 61 at which a vacuum is provided from a vacuum source 66 shown in FIG. 1 so as to support the formed glass sheet after the press forming and ensure forming of the glass sheet to the shape of the forming face. Upon subsequent operation of the actuator 62, the lower press ring 52 is moved downwardly and the upper press mold 58 is moved upwardly and a shuttle 68 of the final processing station 18 is moved by an actuator 70 to move a delivery ring 72 toward the left below the upper mold 58. Termination of the vacuum provided by the vacuum source 66 may then be accompanied by the supply of pressurized gas to the upper mold surface 60 to release the glass sheet onto the delivery ring 72 and the shuttle actuator 70 then moves the shuttle 68 back toward the right to the position illustrated in FIG. 1 such that the delivery ring 72 and the formed glass sheet thereon are delivered for final processing such as slow cooling for annealing or more rapid cooling by air quenching for heat strengthening or tempering between the lower and upper quench heads 74 and 76.

Figure 4:
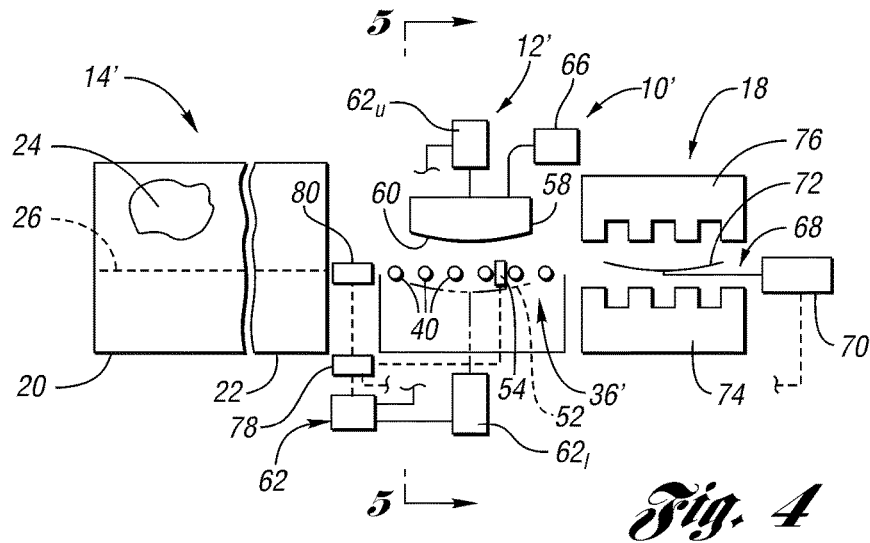
FIG. 4 is a view of a system whose positioning apparatus positions and then forms a flat glass sheet.
Figure 5:
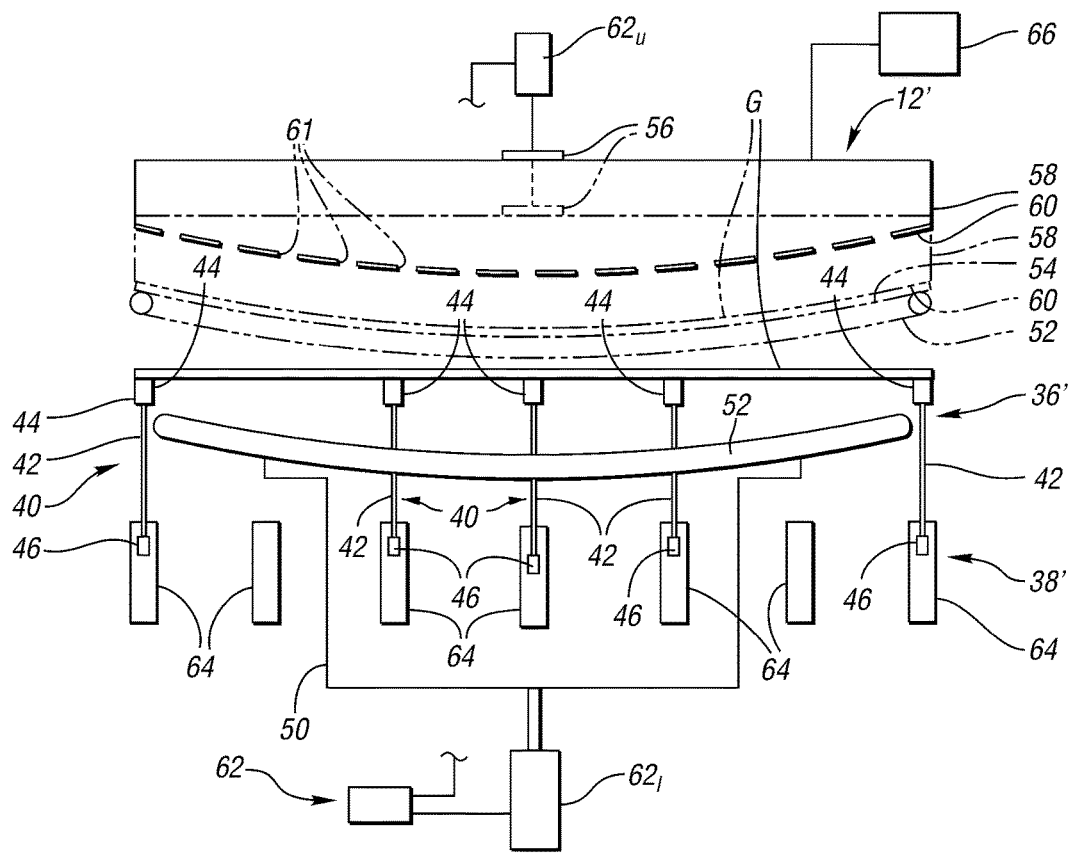
FIG. 5 is a cross-sectional view taken along the direction of line 5-5 in FIG. 4 to further illustrate the flat shape of the glass sheet during the positioning prior to its forming.

With reference to FIGS. 4 and 5, another glass sheet forming system 10' is similar to the embodiment of FIG. 3 but operates to provide positioning and forming of flat glass sheets without any preforming as with the previously described embodiment. Thus, like components thereof have the same reference numerals that are primed for the forming station 12', furnace 14', and press forming apparatus 36' as well as the base structure 38'.

As illustrated in FIGS. 1 and 4, each embodiment of the system 10, 10' includes a controller 78 connected to the mold actuator 62, the shuttle actuator 70, a conveyor drive 80, and the positioning apparatus 54 to coordinate the system operation for the positioning and forming cycle. The systems 10 and 10' each have an unshown sensor like conventional glass sheet forming systems adjacent the junction between the exit end of the roll forming station 16 and the upstream end of the forming station 12 or 12' for sensing the location of a downstream extremity at the lateral center of the conveyed glass sheet.

As shown in FIGS. 6 and 7, the upwardly facing lower forming mold 52 can have curvature both laterally with respect to the direction of conveyance C and along the direction of conveyance C and is mounted on the mold support 50 by adjusters of any suitable type as schematically illustrated by 84 so as to provide adjustment to the upwardly concave design shape to be formed. The pair of laterally spaced positioners 55 are mounted by a positioner drive 86 of the positioning apparatus 54 for movement along the direction of conveyance within an open center of the lower forming mold 52 between the upstream position shown in FIG. 6 and the downstream position shown in FIG. 7. The controller 78 (FIGS. 1 and 4) operates the conveyor drive 80 and the positioner drive 86 in a coordinated manner and provides rotational positioning of a conveyed glass sheet G so as to be properly aligned upon conveyance above the mold 52 for the forming. As the glass sheet is conveyed along the direction of conveyance above the forming mold 52, the laterally spaced positioners 55 are moved along the direction of conveyance from the upstream position of FIG. 6 toward the downstream position of FIG. 7 but at a slower rate than the conveyor such that the positioners contact the glass sheet.

Figure 10:
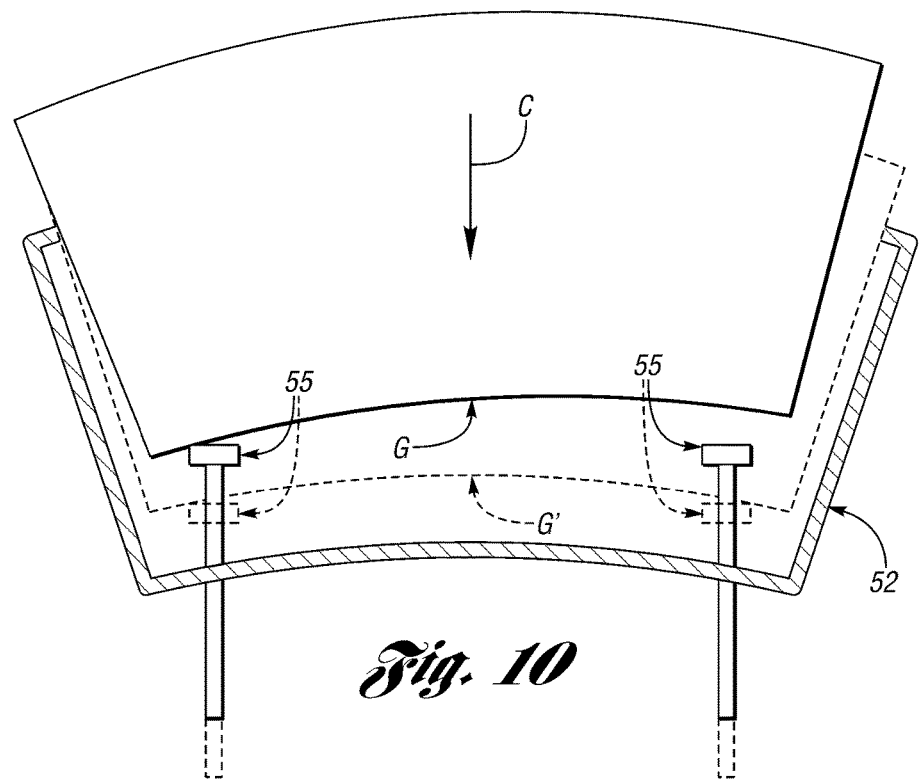
FIG. 10 is a schematic top plan view showing the manner in which a glass sheet is rotated for positioning and vertical alignment with the forming mold for forming.

As illustrated in FIG. 10, the glass sheet G as shown by solid line illustration is initially located counterclockwise from the design rotational position and the contact with the slower moving positioners 55 rotates the glass sheet to the design rotational position illustrated by dash lines so as to be vertically aligned with the forming mold 52 upon farther conveyance in preparation for the press forming. If the glass sheet is initially located clockwise from the design rotational position, the slower moving positioners 55 rotate the glass sheet counterclockwise to the design rotation position. Furthermore, the positioners will not rotate the glass sheet if it initially is in the design rotational position and thus does not require any rotation. After any rotation in either direction, the controller moves the positioners 55 faster than the conveyor speed and the conveyed glass sheet so that the positioners move out of contact with the leading edge of the glass sheet in preparation for the glass sheet moving over and into vertical alignment with the forming mold 52.

It should be mentioned that the amount of rotation to provide the rotational alignment of the glass sheet G with the forming mold 52 does not have to be particularly great. More specifically, it has been found that the ability to adjust for a leading amount of about 5 mm or a trailing amount of about 5 mm, for a total range of 10 mm, is sufficient to provide rotational adjustment to the design position to correct for any rotational variance.

Figure 9:
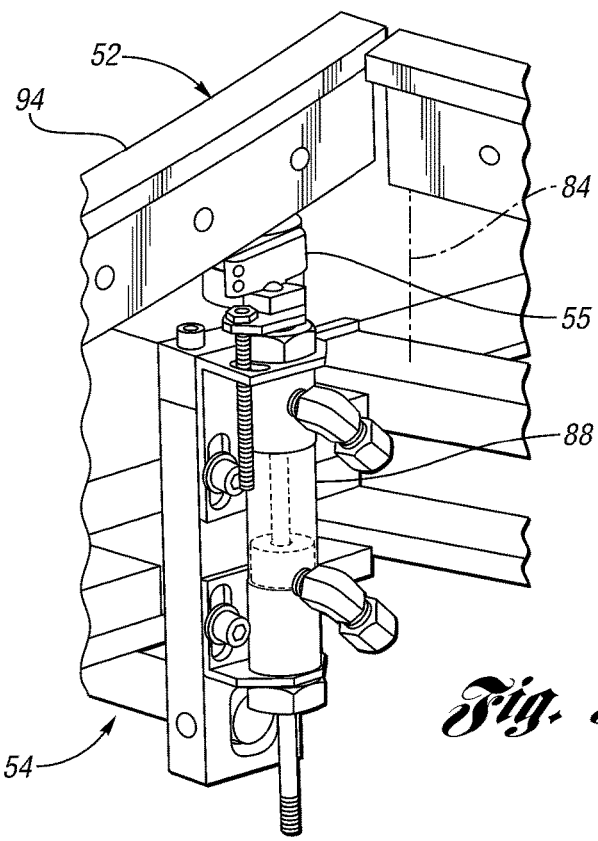
FIG. 9 is a view similar to FIG. 8 but showing a lower position of the positioners that allows the positioned glass sheet to move above and into vertical alignment with the mold after the positioning.
Figure 8:
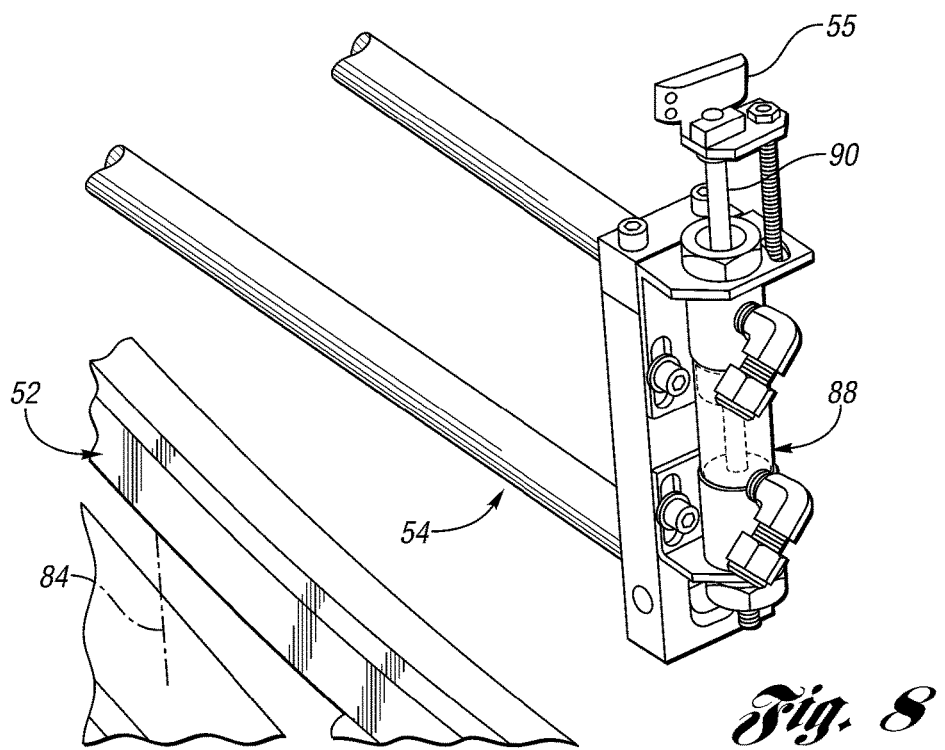
FIG. 8 is a partial view taken similarly to FIG. 6 showing an upper location of the positioners during positioning of the glass sheet with respect to the mold.

As illustrated in FIG. 8, the positioning apparatus 54 includes cylinders 88 whose piston connecting rods 90 are movable vertically and provide supports for the positioners 55 for movement between the FIG. 8 upper position where the positioners contact the glass sheet and a lower position shown in FIG. 9 for allowing the glass sheet to move over the positioners and into vertical alignment above the forming mold 52. More specifically, the forming mold 52 as shown in FIGS. 6 and 7 has an open center 92 and a peripheral shape that corresponds to the periphery of the glass sheet. A downstream portion 94 of the forming mold 52 extends laterally with respect to the direction of conveyance, and the positioners 55 are located within the open center 92 of the forming mold and adjacent its downstream portion 94 and the positioners move toward this downstream portion from the position of FIG. 6 to the position of FIG. 7 during the slower movement of the positioners than the conveyor to provide the glass sheet rotation into rotational alignment with the mold periphery. Prior to the positioners 55 reaching the downstream mold portion 94, the cylinders 88 move the positioners downwardly so the glass sheet can move over the positioners and over the forming mold 52 and into vertical alignment with its peripheral shape.

The systems 10, 10' each have an unshown electric eye sensor of the electromagnetic wave type like conventional glass sheet forming systems at the lateral center of the conveyed glass sheet adjacent the junction between the exit end of the roll forming system 16 or furnace 14' and the upstream end of the forming station 12 or 12'. This type of sensor senses the downstream extremity at the lateral center of the conveyed glass as it approaches or moves into the forming station for forming. Such sensors conventionally initiate operation of the associated forming apparatus. Normally there is about one meter, i.e. 1000 mm, of travel from the sensing to the design position at the mold apparatus where the forming takes place. During that amount of travel, the glass sheet lateral midpoint where the sensing normally takes place can vary plus or minus about 3 mm and the lateral extremities due to rotation during the entire conveyance can vary plus or minus about 5 mm from the lateral midpoint, for a total variance in the range of about plus or minus 8 mm.

With the present systems, the electric eye sensor adjacent the junction between the exit end of the roll forming system 16 or furnace 14' and the upstream end of the forming station 12 or 12' is connected to the controller 78 to initiate operation of the positioning apparatus 54 in coordination with the conveyor and after the positioners complete the positioning and move out of contact with the glass sheet, there is normally less than 100 mm of travel to the design position where the glass sheet is aligned with the forming mold 52 such that there is then normally only a total variance of the glass position from the design position in the range of about 1.2 mm. More specifically, after the positioners 55 move out of contact with the glass sheet, the controller 78 operates the conveyor and the mold actuator 62 in a coordinated manner that provides more accurate positioning of the glass sheet with respect to the forming mold 52 as is hereinafter more fully described.

Figure 11:
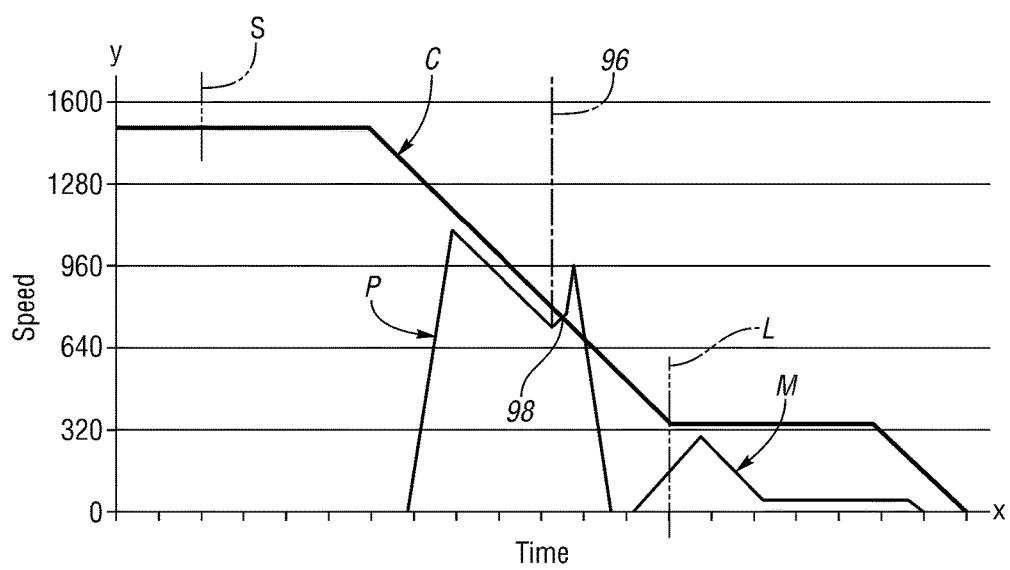
FIG. 11 is a timing chart that illustrates the positioning and forming cycle by the movement of the conveyor, movement of the positioners, and movement of the forming mold upwardly to perform the forming in a press manner with an associated upper mold.

With reference to the timing chart shown in FIG. 11, the X coordinate or abscissa represents the time during a cycle of positioning and forming and the Y coordinate or ordinate represents speed of movement. More specifically, the line C represents the conveyor speed along the horizontal direction of conveyance, the line P represents the speed of the positioners along the horizontal direction of conveyance, and the line M represents the speed of vertical movement of the forming mold 52 under the operation of the controller 78. The conveyor speed C initially moves at a constant index speed during which the electric eye sensor at the time of line S through the operation of the controller 78 initiates the operation of the positioning apparatus 54. Subsequently the conveyor speed C begins to decelerate at a constant rate and the positioners are accelerated until reaching a maximum speed that is slightly less than the conveyor speed and the positioners then begin to decelerate at the same rate as the conveyor. The slower moving positioners contact the glass sheet and provide any required rotational adjustment and also provide any required longitudinal adjustment with respect to the conveyor before reaching the time at phantom line 96. If no rotational adjustment is required, both positioners will contact the glass sheet sooner than is the case when the positioners provide the rotational positioning of the glass as previously described. After the phantom line 96 time, the conveyor speed continues to decelerate and the positioner speed increases until both the conveyor and the positioners have the same speed at the time of intersection 98. The positioners 55 then move out of contact with the conveyed glass sheet as the positioner speed continues to accelerate but at a greater rate and the conveyor speed continues to decelerate. After the disengagement of the positioners 55 from the glass sheet, the positioners move downwardly as previously described and their speed is decelerated until stopping at the locations shown in FIGS. 7 and 9. The conveyor speed and hence the speed of conveyance of the glass sheet then continues to decelerate and the lower mold embodied by the press ring is moved upwardly as shown by the mold line M, with the upward movement initially being relatively rapid to lift the glass sheet from the conveyor whereupon the upward movement is decreased to a relatively slow movement during the pressing with the upper mold and ultimately terminated after completion of the pressing of the glass sheet.

The glass sheet moves out of contact with the positioners at the intersection 98 which is a predetermined distance along the direction of conveyance from the location at lift line L where the lower mold is moved upwardly a sufficient distance to lift the glass sheet from the conveyor and terminate its conveyance. This spacing together with a predetermined speed of the conveyor and the speed of the lifter facilitates correct timing of the actuator 62 for lifting the glass sheet as it is being conveyed into vertical alignment with the mold in order to provide proper positioning for the lifting that terminates the glass sheet conveyance.

Before time line 96 shown in FIG. 11, both the conveyor and the positioners 55 are decelerating at the same rate as each other but the speed of the positioners is slower than the speed of the conveyor, about 100 mm. per second as illustrated. The relevant part of the positioner action starts as the glass sheet approaches the positioners and the positioners have reached their maximum speed, about 100 mm/second slower than the conveyor, and have just started to decelerate with the conveyor at the same rate. Preferably for a glass sheet that has not been rotated and for which the electric eye sensor identified the glass sheet's leading edge correctly and assigned the conveyor's current position to the glass sheet, or registered the glass sheet to the conveyor and for a glass sheet which has not slipped on the conveyor after registration, the glass sheet will have a clearance separation of 10 mm from the positioners at the start of positioning as the positioners just start to decelerate. The positioners will have a 10 mm head start and the ideal glass sheet just discussed will catch up to and contact the slower moving positioners after the positioners have traveled 10 mm less than the conveyor. Typically the relevant part of positioning takes place over a conveyor travel distance of about 200 mm. During that conveyor travel, the positioners travel in the same direction but travel 20 mm less than the conveyor travel distance. Thus, if the positioners were in contact with the glass sheet from the start of their slower movement, they would retard the glass sheet movement 20 mm, but would only retard the ideal glass sheet 10 mm as discussed above.

After the rotational and longitudinal adjustment, the glass sheet will be at the time line 96 of FIG. 11 when the speed of the positioners accelerates as the speed of the conveyor continues to decelerate. For an additional 1.5 mm of retarding movement of the glass sheet after time line 96, the positioners are still going slower than the conveyor, so the glass sheet is still pressed against the positioners. More specifically, at the time point 96, the glass sheet is slipping on the conveyor rolls by 100 mm per second and is moving at the speed of the positioners. Between time line 96 and time point 98, the speed of the glass sheet increases to the speed of the conveyor. The coefficient of friction between glass sheet and the conveyor is then initially the dynamic coefficient of friction rather than the static coefficient of friction because of the slippage taking place. So the positioners must be accelerated slowly between time line 96 and time point 98 so they do not pull away from the glass sheet until the glass sheet has stopped slipping on the conveyor and its speed of conveyance is the same as the conveyor speed. At time point 98, the speed of the positioners and the speed of the conveyor, and hence also the speed of the glass sheet, are the same, so there is no slippage and the conveyor then controls the speed of the glass sheet conveyance. This is important because the positioners have delivered the glass sheet at time point 98 very accurately under the operation of the controller 78 in coordination with the conveyor so the glass sheet conveyance to the design position with respect to the forming mold 52 can be accurately controlled.

The conveyor, not the positioner, thus has control of the glass sheet movement for about the last 80 mm before pick-up by the forming mold. This removes the inaccuracy of the positioning provided only by the sensor as previously described and inaccuracy due to slip between the glass sheet and the rolls over the meter or so of travel from the sensor to time point 98. Time point 98 is related very accurately to the mold design position by the controller 78 and coordinated conveyor operation for electrically controlled delivery of the glass sheet to the design position for the pick-up and forming.

After the positioning and press forming as described above, the forming mold 52 is moved downwardly and the upper mold 58 is moved upwardly with the glass sheet thereon by the provision of the vacuum previously discussed so that the delivery ring 72 can be moved into the forming station to receive the formed glass sheet for final processing, either quenching or annealing as previously discussed.

The total positioning and forming cycle time is less than 2 seconds and specifically is about 1⅔ seconds.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus for positioning a heated glass sheet for forming, comprising:
   a roll conveyor including rolls that provide an upwardly concave conveying shape for conveying a heated glass sheet horizontally at a conveyor speed in a path along a direction of conveyance;
   a conveyor drive that drives the roll conveyor;
   an upwardly facing forming mold having an upwardly concave curved shape and an open center, and the forming mold also having a peripheral shape that corresponds to the periphery of the glass sheet as well as having a downstream portion along the direction of conveyance;
   a pair of positioners laterally spaced at a location along the direction of conveyance in the path of the conveyed glass sheet and located within the open center of the forming mold for movement between upstream and downstream positions as the glass sheet is moved above the forming mold;
   a positioner drive for moving the pair of positioners along the direction of conveyance, and supports for the positioners permit movement thereof vertically between an upper position to contact the glass sheet and a lower position that allows the glass sheet to move over the positioners; and
   a controller configured to operate the conveyor drive and the positioner drive to: (a) convey the heated glass sheet horizontally on the roll conveyor at a decelerating conveyor speed in a direction of conveyance along a path toward a vertically aligned position above a forming mold; (b) move the pair of positioners while in their upper position along the direction of conveyance at a decelerating speed that is slower than the conveyor speed such that the conveyed glass sheet contacts the positioners for a sufficient time to provide rotational adjustment of the glass sheet on the roll conveyor to correct any rotation from a design rotational position with respect to the forming mold; (c) continue to decelerate the speed of conveyance and accelerate the speed of the positioners while in their upper position until the speed of the conveyor and the speed of the positioners are the same as each other and then continuing to increase the relative speed of the positioners with respect to the speed of the conveyance so the positioners move faster than the conveyor speed and the conveyed glass sheet and the positioners move out of contact with the glass sheet in preparation for the glass sheet moving over and into vertical alignment with the forming mold; (d) after the speed of the conveyor and the speed of the positioners are the same as each other, the increase of the relative speed of the positioners with respect to the speed of conveyance is provided by continuing to decelerate the speed of the conveyor and accelerating the speed of the positioners but at a greater rate of acceleration than before the positioners move out of contact with the glass sheet; and (e) after the positioners move out of contact with the glass sheet, move the positioners downwardly to their lower position so the glass sheet can move over the positioners and over the forming mold into vertical alignment with its peripheral shape.

2. Apparatus for positioning a heated glass sheet for forming as in claim 1 wherein the controller is configured to operate the conveyor drive and the positioner drive so the speed of the conveyor and the speed of the positioners are decelerated at the same rate as each other prior to the glass sheet contacting the positioners.

3. Apparatus for positioning a heated glass sheet for forming as in claim 1 further including a mold actuator for moving the forming mold upwardly to lift the moving glass sheet from the conveyor for forming.

4. Apparatus for positioning a heated glass sheet as in claim 1 further including an upper mold that cooperates with the forming mold to press form the glass sheet.

5. Apparatus for positioning and forming a heated glass sheet, comprising:
   a roll conveyor including rolls that provide an upwardly concave conveying shape for conveying a heated glass sheet horizontally at a conveyor speed in a path along a direction of conveyance;
   a conveyor drive that drives the roll conveyor;
   an upwardly facing peripheral forming mold having an open center and an upwardly concave curved shape that corresponds to the periphery of the heated glass sheet, and the forming mold having a downstream portion;
   a lower mold actuator for moving the forming mold upwardly to form the glass sheet;
   an upper mold located above the forming mold;
   an upper mold actuator for moving the upper mold downwardly to cooperate with the forming mold to press form the glass sheet;
   a pair of positioners located within the open center of the forming mold adjacent its downstream portion and spaced laterally along the direction of conveyance in the path of the heated glass sheet and movable between upstream and downstream positions as the glass sheet is moved above the forming mold;
   a positioner drive for moving the pair of positioners along the direction of conveyance, and supports for the positioners for movement vertically between an upper position to contact the glass sheet and a lower position that allows the glass sheet to move over the positioners; and a controller configured to operate the conveyor drive, the positioner drive, and the mold actuators so: (a) the pair of positioners are initially moved along the direction of conveyance at a slower speed than the conveyor speed, while both the speed of the conveyor and the speed of the positioners decelerate at the same rate as each other, such that the positioners contact the conveyed glass sheet to provide rotational adjustment thereof; (b) the speed of the conveyor then continues to decelerate and the speed of the positioners while in their upper position is accelerated until the speed of the conveyor and the speed of the positioners are the same as each other; (c) the relative speed of the positioners while in their upper position is increased with respect to the speed of conveyance by continuing to decelerate the speed of the conveyor and accelerating the speed of the positioners so the positioners then move faster than the conveyor speed so as to move out of contact with the glass sheet in preparation for the glass sheet moving into vertical alignment with the forming mold, (d) the lower mold actuator then moves the forming mold upwardly and the upper mold actuator moves the upper mold downwardly to cooperatively press form the glass sheet; and (e) after the positioners move out of contact with the glass sheet, move the positioners downwardly to their lower position so the glass sheet can move over the positioners and over the forming mold into vertical alignment with its peripheral shape.

6. Apparatus as in claim 1 further including a final processing station located downstream along the direction of conveyance.

7. Apparatus as in claim 6 further including a final processing station located downstream along the direction of conveyance.

* * * * *